United States Patent
Blias

(10) Patent No.: US 8,750,074 B2
(45) Date of Patent: Jun. 10, 2014

(54) ANISOTROPIC PARAMETER DETERMINATION

(75) Inventor: Emanouil Blias, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 420 days.

(21) Appl. No.: 12/621,972

(22) Filed: Nov. 19, 2009

(65) Prior Publication Data
US 2010/0128562 A1    May 27, 2010

Related U.S. Application Data

(60) Provisional application No. 61/117,613, filed on Nov. 25, 2008.

(51) Int. Cl.
*G01V 1/30* (2006.01)
*G01V 1/28* (2006.01)
*G01V 1/42* (2006.01)

(52) U.S. Cl.
CPC  *G01V 1/303* (2013.01); *G01V 1/42* (2013.01); *G01V 2210/626* (2013.01); *G01V 2210/66* (2013.01)
USPC ............................................. 367/73; 367/57

(58) Field of Classification Search
USPC ........................................ 367/57, 73; 702/11
See application file for complete search history.

(56) References Cited

U.S. PATENT DOCUMENTS

| | | | |
|---|---|---|---|
| 5,742,560 A * | 4/1998 | Krebs | 367/57 |
| 6,094,400 A | 7/2000 | Ikelle | |
| 6,714,873 B2 | 3/2004 | Bakulin et al. | |
| 6,864,890 B2 | 3/2005 | Meek et al. | |
| 6,894,949 B2 * | 5/2005 | Aronstam | 367/57 |
| 6,985,405 B2 | 1/2006 | Ren et al. | |
| 7,508,735 B2 * | 3/2009 | Grechka et al. | 367/57 |
| 7,751,279 B2 * | 7/2010 | Zhao et al. | 367/57 |
| 7,911,878 B2 * | 3/2011 | Zhao et al. | 367/57 |
| 2007/0115755 A1 * | 5/2007 | Grechka et al. | 367/75 |
| 2011/0267921 A1 * | 11/2011 | Mortel et al. | 367/25 |

OTHER PUBLICATIONS

Thomsen; "Weak elastic anisotropy," Geophysics, vol. 51, No. 10, (Oct. 1986), pp. 1954-1966.
Tsvankin; "Anisotropic parameters and P-wave velocity for orthorhombic media," Geophysics, vol. 62, No. 4 (Jul.-Aug. 1997), pp. 1292-1309.
Postma; "Wave Propagation in a Stratifield Medium," Geophysics, vol. XX, No. 4, (Oct. 1955), pp. 780-806.
Castle; "A theory of normal moveout," Geophysics, vol. 59, No. 6 (Jun. 1994), pp. 983-999.

(Continued)

*Primary Examiner* — Ian J Lobo
(74) *Attorney, Agent, or Firm* — Chowdhury & Georgakis, P.C.

(57) ABSTRACT

A walkaway VSP survey is carried out using a receiver array. First arrivals to a plurality of receivers are picked and used to estimate a normal-moveout (NMO) velocity. Using the NMO velocity and vertical velocities estimated from the VSP data, two anisotropy parameters are estimated for each of the layers. The anisotropy parameters may then be used to process surface seismic data to give a stacked image in true depth and for the interpretation purposes. For multi-azimuthal walkaway or 3D VSP data, we determine two VTI parameters $\epsilon$ and $\delta$ for multi-azimuth vertical planes. Then we determine five anisotropic interval parameters that describe P-wave kinematics for orthorhombic layers. These orthorhombic parameters may then be used to process surface seismic data to give a stacked image in true depth and for the interpretation purposes.

22 Claims, 2 Drawing Sheets

(56) References Cited

OTHER PUBLICATIONS

Dix; "Seismic Velocities From Surface Measurements," Geophysics, vol. XX, No. 1 (Jan. 1955), pp. 68-86.
Blias, "Long-spreadlength approximations to NMO function for a multi-layered subsurface," CSEG Recorder, Mar. 2007, pp. 37-42.
Blias; Analytical description of azimuthally-dependent NMO velocity and Dix type inversion for horizontally layered, azimuthally anisotropic media, CSEG Recorder, May 2007, pp. 31-38.
Lou et al.; "Vector Kirchhoff Migration of First Order Downgoing Multiples from VSP Data," SEG/San Antonio 2007 Annual Meeting, pp. 3059-3063.
Reiter et al.; "Imaging with deep-water multiples," Geophysics, vol. 56, No. 7, (Jul. 1991), pp. 1081-1086.
Gaiser; "Transversely Isotropic Phase Velocity Analysis From Slowness Estimates," Journal of Geophysical Research, vol. 95, No. B7, Jul. 10, 1990, pp. 11,241-11,254.
Miller; "An exact inversion for anisotropic moduli from phase slowness data," Journal of Geophysical Research, vol. 99, No. B11, Nov. 10, 1994, pp. 21,651-21,657.
A.A. Malovichko, "A new representation of the travel time curves of reflected waves in horizontally layered media," Applied Geophysics, 1978, vol. 91, No. 1, pp. 47-53 (in Russian).
B.T. May et al., "High-order moveout spectra," Geophysics, Jul. 1979, vol. 44, No. 7, pp. 1193-1207.
Patents Act 1977: Examination Report under Section 18(3), Jul. 19, 2012, UK Appl. Serial No. GB1109106.3 (8 unnumbered pages).
PCT International Search Report, Jul. 2, 2010, Intl. Appl. Serial No. PCT/US2009/065397 (3 unnumbered pages).
PCT Written Opinion of the International Searching Authority, Jul. 2, 2010, Intl. Appl. Serial No. PCT/US2009/065397 (4 unnumbered pages).

* cited by examiner

ANISOTROPIC PARAMETER DETERMINATION

CROSS-REFERENCES TO RELATED APPLICATIONS

This application claims priority from U.S. Provisional Patent Application Ser. No. 61/117,613 filed on Nov. 25, 2008.

BACKGROUND OF THE DISCLOSURE

1. Field of the Disclosure

This disclosure relates to a method of geophysical prospecting which improves the accuracy of seismic migration and depth velocity model building. Specifically, the disclosure uses a walkaway, multi-azimuthal walkaway or 3D VSP survey for determination of anisotropy parameters characterizing subsurface velocities that may be used for imaging of reflections.

2. Description of the Related Art

In surface seismic exploration, energy imparted into the earth by a seismic source reflects from subsurface geophysical features and is recorded by a multiplicity of receivers. This process is repeated numerous times, using source and receiver configurations which may either form a line (2-D acquisition) or cover an area (3-D acquisition). The data which results is processed to produce an image of the reflectors using a procedure known as migration.

Conventional reflection seismology utilizes surface sources and receivers to detect reflections from subsurface impedance contrasts. The obtained image often suffers in spatial accuracy, resolution and coherence due to the long and complicated travel paths between source, reflector, and receiver.

Prior art methods have used a walkaway Vertical Seismic Profile (VSP) and 3D VSP surveys to estimate formation velocities. Common to the prior art methods is an assumption that the earth is isotropic. It has been recognized for several years that the earth is anisotropic, i.e., that the velocity of compressional waves depends upon the direction of propagation.

P-wave anisotropy is manifested by a change in the compressional wave velocity with direction of propagation in earth formations due to combined effects of sedimentary layering and the intrinsic anisotropy of the rock. Shales, in particular, could exhibit more than a 20% difference in P-wave velocities parallel to bedding and P-wave velocities perpendicular to bedding. Sandstones and limestones usually show smaller differences in velocity with direction of propagation. Postma (1955) showed that a type of anisotropy called transverse isotropy could be exhibited by seismic waves propagating through a thin layering of isotropic materials.

Determination of anisotropic velocities from surface seismic data using reflected waves is difficult due to the relatively poor data quality (regular and irregular noise influence when applying velocity analysis on primary waves) and the relatively low frequencies of surface seismic data. This procedure requires long source-receiver offsets, about 1.5 or more times the depth of interest. The long offsets complicate acquisition and processing. Nevertheless, there is prior art on the determination of an anisotropic velocity model for depth imaging of seismic data. See, for example, U.S. Pat. No. 6,864,890 to Meek et al.

The present disclosure addresses the problem of determining anisotropic formation velocities using a walkaway or 3D VSP survey. In a walkaway VSP survey, measurements are made using a plurality of receivers in a borehole responsive to excitation of one or more seismic sources at a plurality of distances from the wellbore. The estimated velocities and two VTI interval parameters $\epsilon$ and $\delta$ may then be used for migration of the walkaway VSP data or of surface seismic data and for interpretation purpose.

SUMMARY OF THE DISCLOSURE

One embodiment of the disclosure is a method of evaluating an earth formation. The method includes deploying an array of seismic receivers in a borehole and recording seismic signals in the array of receivers responsive to an activation of a seismic source at a plurality of positions on the surface of the earth. For a walkaway geometry, the method further includes estimating, from travel times of seismic waves from the plurality of source positions to the plurality of receivers, velocities of vertically propagating seismic waves in a plurality of intervals, and two anisotropy parameters $\epsilon$ and $\delta$ related to a normal moveout curve of compressional waves for the plurality of intervals. The estimated vertical velocities and the estimated interval anisotropy parameters may be used to further process surface seismic data to give a seismic image in depth for the purpose of interpretation. For a multi-azimuthal walkaway or 3D VSP geometry, the method may further include estimating, from travel times of seismic waves from the plurality of source positions around the well to the plurality of receivers, velocities of vertically propagating seismic waves in a plurality of intervals, and five orthorhombic anisotropy parameters $\epsilon_1$, $\epsilon_1$, $\delta_1$, $\delta_2$ and $\delta_3$ related to a normal moveout velocity of compressional waves for the plurality of intervals. The estimated vertical velocities and the estimated anisotropy parameters may be used to further process surface seismic data to give a seismic image in depth for the purpose of interpretation.

Another embodiment of the disclosure is a system for evaluating an earth formation. The system includes an array of seismic receivers configured to be deployed in a borehole and record seismic signals responsive to an activation of a seismic source at a plurality of positions near the surface of the earth. The system further includes a processor configured to estimate, from travel-times of seismic waves from the plurality of source positions to the plurality of receivers, velocities of vertically propagating seismic waves in a plurality of intervals, and two anisotropy parameters $\epsilon$ and $\delta$ related to a normal moveout curve of compressional waves for the plurality of intervals. In case of multi-azimuthal walkaway survey or 3D VSP data, the system may further include a processor configured to estimate, from travel-times of seismic waves from the plurality of source positions around the well to the plurality of receivers, velocities of vertically propagating seismic waves in a plurality of intervals, and five orthorhombic anisotropy parameters $\epsilon_1$, $\epsilon_1$, $\delta_1$, $\delta_2$ and $\delta_3$ related to azimuthally-dependent normal moveout curves of compressional waves for the plurality of intervals.

Another embodiment of the disclosure is a computer-readable medium accessible to at least one processor. The medium includes instructions which enable the at least one processor to estimate, using travel-times of seismic downgoing direct P waves from a plurality of source positions (walkaway geometry) to a plurality of receivers in a borehole, velocities of vertically propagating seismic P waves in a plurality of intervals, and two anisotropy parameters related to a normal moveout curve of compressional waves for the plurality of intervals. In case of 3D VSP survey, the medium may include instructions which enable the at least one processor to estimate, using travel-times of seismic downgoing direct P waves from a plurality of source positions (walkaway geometry) to a plurality of receivers in a borehole, velocities of vertically propagating seismic P waves in a plurality of intervals, and five orthorhombic anisotropy parameters related to azimuthally-dependent normal moveout curves of compressional waves for the plurality of intervals.

BRIEF DESCRIPTION OF THE DRAWINGS

The present disclosure is best understood by reference to the attached figures in which like numerals refer to like elements, and in which.

DETAILED DESCRIPTION OF THE DISCLOSURE

Figure 1:
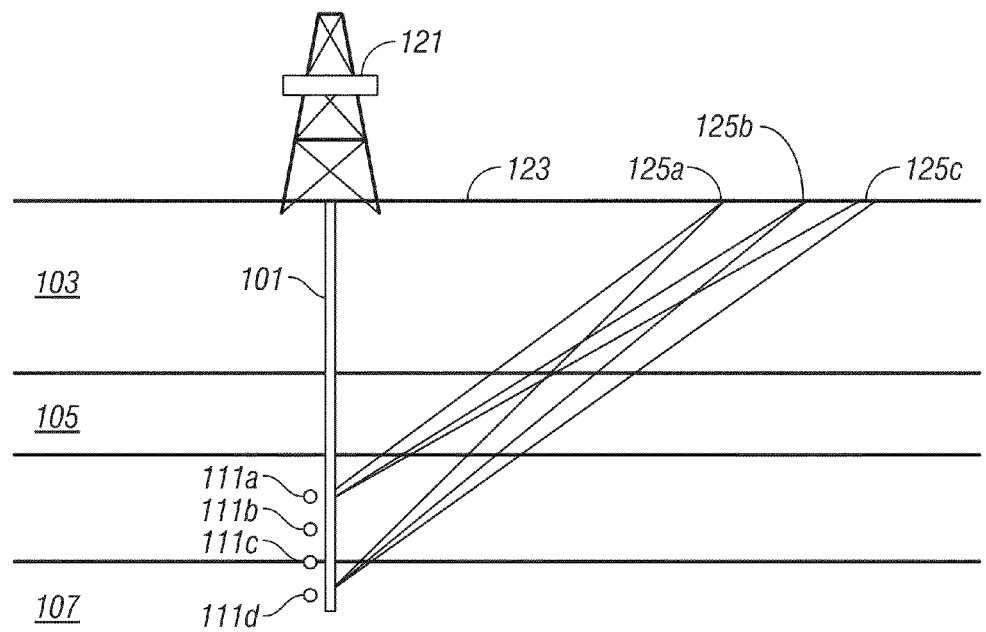
FIG. 1 illustrates the geometry of data acquisition of a walkaway VSP according to the present disclosure.

For the present disclosure, the acquisition geometry of a walkaway VSP is illustrated in FIG. 1. Shown therein is the surface of the earth 123 with a rig 121 thereon. This may be a drilling rig or it may be a mast rig which conveys a wireline into a borehole 101. The borehole 101 penetrates layers 103, 105 . . . Positioned in the borehole 101 are seismic sensors (also called "sensors," "seismic receivers," "VSP receivers" "receivers" herein) denoted by 111a, 111b, 111c, 111d . . . Each of the sensors may include a hydrophone, a single-component geophone or a multi-component geophone. Data for a single offset VSP is typically acquired using a single seismic source such as 125a at the surface (or within a body of water at the surface). Exemplary raypaths which depict the propagation of seismic energy from the source 125a to the sensors 111a through 111d are shown.

Figure 2:
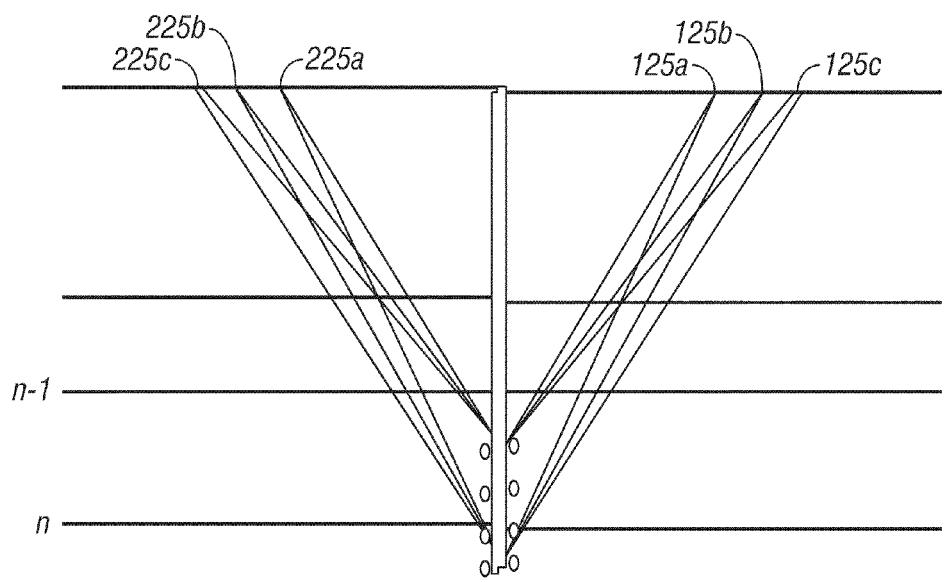
FIG. 2 illustrates the simulated geometry of a surface seismic reflection survey using a walkaway VSP survey.

FIG. 2 shows the simulated geometry of a surface seismic survey derived from the walkaway VSP survey of FIG. 1. A vertical borehole has been assumed, the sources have been "reflected" in the borehole to simulated receiver locations on the surface 225a, 225b, 225c . . . similarly, the raypaths have also been reflected to give simulated raypaths on the left side of the borehole.

Let t(x,z) be first break time (time arrival for downgoing P wave of the seismic energy) where x is the offset, the offset being a distance from a seismic source to a seismic receiver receiving the downgoing P wave from the seismic source (the distance being represented as a horizontal distance in FIGS. 1 and 2), and z is a seismic receiver depth (the depth being represented as a vertical distance in FIGS. 1 and 2). Then we can find the reflected traveltimes $t_1(x)$ and $t_2(x)$ (also called "reflected times" or "reflection times", "simulated reflected times" "simulated surface reflected times" herein) for two virtual boundaries at the depth $z_1$ and $z_2$ of the seismic receivers:

$$t_1(x) = t(-x, z_1) + t(x, z_1)$$

$$t_2(x) = t(-x, z_2) + t(x, z_2)$$

If we do not have sources at the both points −x an x (at the same distance but at the opposite sides from the well), we calculate "reflected" time $t_1(x)$ for each pint x as: $t_1(x) = 2t(x, z_1)$.

For the reflection times, we can write the Taylor series expansion:

$$t^2(x) = t_0^2 + \frac{x^2}{V_{NMO}^2} + c_2 x^4 + \ldots , \quad (1)$$

where t(x) is the time at a source receiver offset of x, (note that this distance is twice the value of x for the VSP), $t_0$ is the zero-offset time (when the source coincides with the receiver at the surface), $V_{NMO}$ is the NMO velocity. Several methods are known in the art for estimating $V_{NMO}$. The main idea of the approximations is to represent the travel time for a layered medium by a power series in $x^2$ and to select the terms in the power series so as to match the actual travel time and the first two derivatives with respect to $x^2$. This is discussed in detail in Blias (CSEG Recorder, March 2007).

Applying the Dix relation, this gives $$V_{Dix} = \sqrt{\frac{t_{0,2} V_{NMO,2}^2 - t_{0,1} V_{NMO,1}^2}{t_{0,2} - t_{0,1}}} . \quad (2)$$

where $t_{0,1}$, $V_{NMO,1}$ and $t_{0,2}$, $V_{NMO,2}$ correspond to the reflection boundaries comprising the horizontal layer between the depths $z_1$ and $z_2$.

For a vertically transversely isotropic (VTI) medium, $$V_{Dix} = V_{Vert}\sqrt{1+2\delta} \quad (3),$$

where $V_{Vert}$ is the vertical velocity and $\delta$ is an anisotropy interval parameter defined by Thomsen.

Thomsen defined the parameters $\delta$ and $\epsilon$ as $$\delta = \frac{(C_{13} + C_{44})^2 - (C_{33} - C_{44})^2}{2C_{33}(C_{33} - C_{44})},$$

$$\varepsilon = \frac{C_{11} - C_{33}}{2C_{33}}$$

where the elastic modulii for the TI material are given by the matrix $$\begin{bmatrix} C_{11} & C_{11} - 2C_{66} & C_{13} & 0 & 0 & 0 \\ C_{11} - 2C_{66} & C_{11} & C_{13} & 0 & 0 & 0 \\ C_{13} & C_{13} & C_{33} & 0 & 0 & 0 \\ 0 & 0 & 0 & C_{44} & 0 & 0 \\ 0 & 0 & 0 & 0 & C_{44} & 0 \\ 0 & 0 & 0 & 0 & 0 & C_{66} \end{bmatrix}.$$

Strictly speaking, eqn (3) is correct only when $V_{Dix}$ is estimated using short offsets. For the purposes of this disclosure, we may refer to $\delta$ as an anisotropy parameter related to the NMO velocity and $\epsilon$ as an anisotropy parameter related to the horizontal velocity.

$V_{Vert}$ in eqn (3) is measurable from the zero offset survey as the vertical velocity between depths $z_1$ and $z_2$. This then gives an estimate of the value of $\delta$ in the interval between $z_1$ and $z_2$ as:

$$\delta = \frac{V_{Dix}^2 - V_{Vert}^2}{2V_{Vert}^2}. \quad (4)$$

The method discussed above uses the first breaks of arrivals in the borehole.

Figure 3:
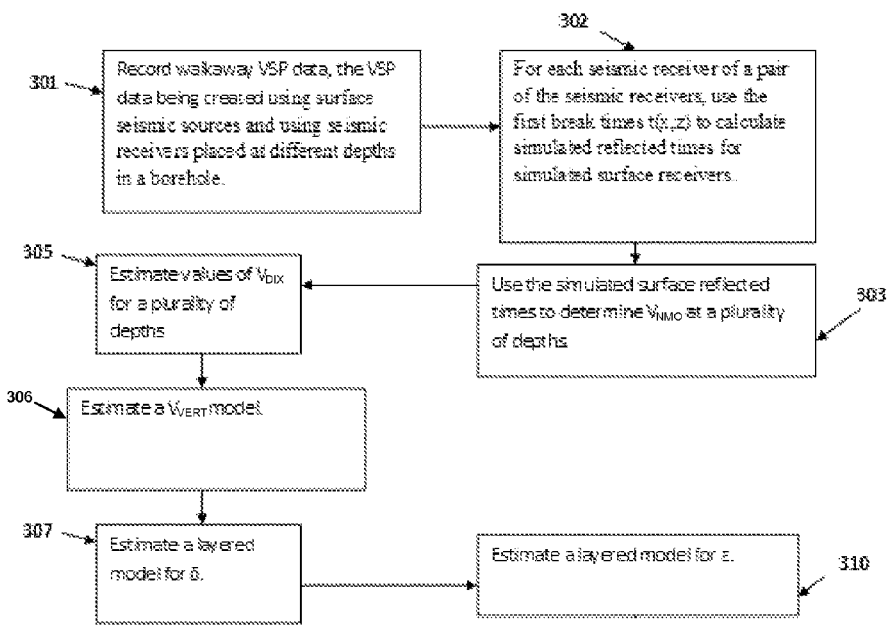
FIG. 3 shows a flow chart illustrating how the method of the present disclosure may be used for processing seismic data.

In one embodiment of the disclosure, within the receiver array depth interval, for each pair of the receivers with some minimum distance (about 50-100 m), δ is estimated. The estimated δ is smoothed to give a smoothed δ as a function of depth. If there are boundaries in the formation within the array where the subsurface property changes significantly (e.g., lithology changes), the δ may be determined between these boundaries. The parameter δ is important because knowing δ and velocity $V_{Dix}$, calculated through the Dix formula from the simulated surface seismic data comprising simulated reflected times as described above, it is possible to estimate the vertical velocity that is needed for time-to-depth conversion of seismic post-stack data. This is discussed with reference to FIG. 3.

Walkaway VSP data using surface seismic sources and seismic receivers placed at different depths in a borehole are recorded 301 as discussed above. As previously described, the walkaway VSP data includes a first break time t(x,y) at each seismic receivers. For each seismic receiver a pair of the seismic receivers, the first break times t(x,y) are used 302 to calculate simulated reflected times for simulated surface receivers, as discussed above. Using the simulated reflected times, as discussed above, $V_{NMO}$ is estimated for a layered model 303. From the $V_{NMO}$ estimates, $V_{DIX}$ is calculated 305 using eqn (2). In some embodiments, $V_{VERT}$ is obtained 306 from the zero-offset survey, as explained above. A layered model of δ is calculated 307 using eqn. (4). This may be repeated for additional arrays in the borehole. For example, steps 301-310 may be repeated for each pair of the seismic receivers in the borehole to determine $V_{NMO}$ at additional depths. In addition, the seismic receivers may be repositioned and the process repeated to determine $V_{NMO}$ at still more depths. The second Thomsen parameter ε is then estimated 310, as described below.

To estimate the Thomsen ε parameter within the receiver array interval, in one embodiment of the disclosure, the moveout function t(x) is approximated by a shifted hyperbola.

$$t_j(x) = t_{0,j}\left(1 - \frac{1}{A_j}\right) + \frac{1}{A_j}\sqrt{t_{0,j}^2 + A_j \frac{x^2}{V_{NMO,j}^2}} \quad j = n-1, n \quad (5)$$

using the least squares method. Here $$t_{0,n} = 2\sum_{k=1}^{n} \frac{h_k}{v_k}, \quad (6)$$

$$\frac{1}{V_{NMO,n}^2} = \frac{\sum_{k=1}^{n} \frac{h_k}{v_{P,k}}}{\sum_{k=1}^{n} h_k v_k(1 + 2\delta_k)} \quad (7)$$

$$A_n = \frac{\left(\sum_{k=1}^{n} \frac{h_k}{v_k}\right)\left(\sum_{k=1}^{n} h_k v_k^3 B_k\right)}{\left(\sum_{k=1}^{n} h_k v_k\right)^2} \quad (8)$$

$$B_k = 1 + 8\frac{(\varepsilon_k - \delta_k)}{(1 + 2\delta_k)}\left(1 + 2\frac{\delta_k \gamma_k^2}{(1 + 2\delta_k)(1 - \gamma_k^2)}\right),$$

where n is the number of a layer between the first and second receivers, i.e., there are n layers above the second receiver, $v_k$ is the vertical velocity in layer k, $\gamma_k$ is the ratio of the shear velocity $v_s$ to the compressional wave velocity in layer k.

The ratio $$\frac{\gamma^2}{(1 - \gamma^2)}$$

lies between 0 and 0.5. For an assumed value of the $$\frac{\gamma^2}{(1 - \gamma^2)}$$

of 0.25, this gives $$B_k = 1 + 8\frac{(\varepsilon_k - \delta_k)}{(1 + 2\delta_k)}\left(1 + \frac{\delta_k}{2(1 + 2\delta_k)}\right) \quad (9)$$

with a relative error of less than 1%.

For the first receiver at the depth $z_1$, the eqns. (6)-(9) may be rewritten replacing n by n−1.

After some manipulations, this gives:

$$B_n = \frac{(t_{0,n} - t_{0,n-1})(A_n t_{0,n} V_{NMO,n}^4 - A_{n-1} t_{0,n-1} V_{NMO,n-1}^4)}{(t_{0,n} V_{NMO,n}^2 - t_{0,n-1} V_{NMO,n-1}^2)^2} \quad (10)$$

This then gives, using eqn (9):

$$\varepsilon_n = \delta_n + \frac{B_n - 1}{8M_n} \quad (11)$$

where $$M_n = \frac{1}{(1 + 2\delta_n)}\left(1 + \frac{\delta_n}{2(1 + 2\delta_n)}\right) \quad (12)$$

Usually, walkaway survey includes one position of a multichannel receiver array. However, if it is desired to determine interval anisotropic parameters ε and δ for the entire subsurface interval above total depth (TD), the multi-channel receiver array may be deployed at additional depths. It is then possible to determine the two anisotropic parameters ε and δ for the anisotropic depth migration of the surface seismic data for the entire subsurface above total well depth.

One embodiment of the disclosure extends the method described above to an orthorhombic horizontally layered medium. Such an orthorhombic horizontally-layered medium results from introducing, for example, vertical fractures in a VTI medium. We will use Tsvankin's notations (Tsvankin, 1997) to describe orthorhombic anisotropy. For P-wave, Tsvankin's notation includes vertical velocity and five dimensionless parameters: the VTI Thomsen's parameters $\delta_2$ and $\epsilon_2$ for [$x_1$, $x_3$] symmetry plane, $\delta_1$ and $\epsilon_1$ for [$x_2$, $x_3$] symmetry plane and parameter $\delta_3$ for in the horizontal symmetry plane [$x_1$,$x_3$]. Knowing vertical velocity from zero-offset VSP, we can estimate anisotropic coefficients $\delta_1$ and $\delta_2$ and symmetry azimuth θ from NMO ellipse obtained from multi-azimuth first breaks (Blias, CSEG Recorder, May 2007).

Coefficients $\epsilon_1$, $\epsilon_2$, and $\delta_3$ can be estimated through first breaks non-hyperbolic approximations assuming weak anisotropy with respect to these parameters. In this case, each vertical plane with azimuth α can be considered as VTI plane (Tsvankin, 1997). Coefficients $\epsilon(\alpha)$ and $\delta(\alpha)$ in the vertical plane with azimuth α are estimated using Dix type inversion described for VTI layered model. To estimate parameter $\epsilon_1$, $\epsilon_2$ and $\delta_3$, we use equation derived by Tsvankin (1997)

$$\epsilon(\alpha_k)=\epsilon_1 \sin^4(\alpha_k-\theta)+\epsilon_2 \cos^4(\alpha_k-\theta)+(2\epsilon_2+\delta_3)\sin^2(\alpha_k-\theta)\cos^2(\alpha_k-\theta)$$

Using the least-square method, we estimate these parameters by minimizing quadratic function $f(\epsilon_1,\epsilon_2,\delta_3)$:

$$F(\delta_1, \delta_2, \theta_1) = \sum_{k=1}^{n} [\delta(\alpha_k) - \delta_1 \sin^2(\alpha_k - \theta) - \delta_2 \cos^2(\alpha_k - \theta)]^2$$

Figure 4:
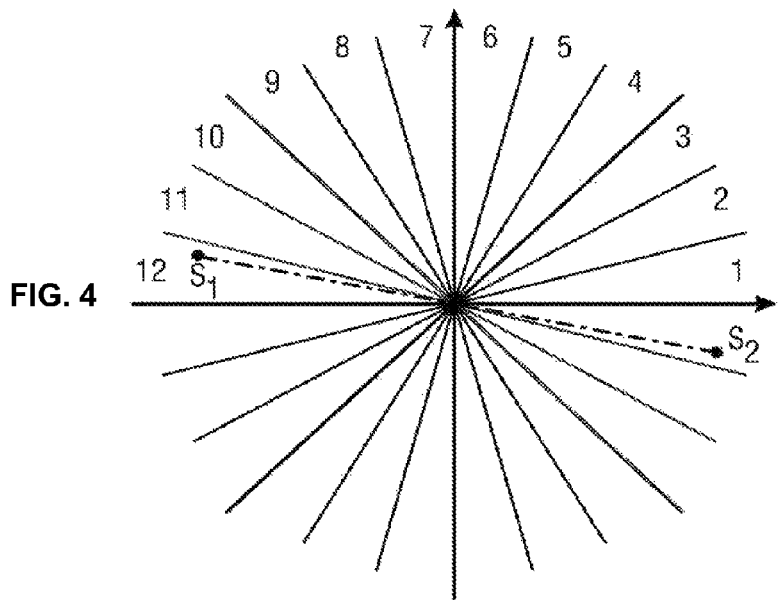
FIG. 4 shows sectors created from 3D VSP geometry to determine VTI parameters in each sector.

To estimate $\epsilon(\alpha)$ and $\delta(\alpha)$ for several azimuths α, multi-azimuthal walkaway survey or 3D VSP data are needed. Multi-azimuthal walkaway geometry may include at least 6 walkaway lines through the well, at 30° increment. For stable estimates, it's better to have 9 walkaway lines with 20° increment. 3D VSP data provides azimuthal estimates with many sectors. Modeling shows that 12 sectors with 15 degrees each provide stable estimates of five anisotropic orthorhombic parameters $\epsilon_1$, $\epsilon_2$, $\delta_1$, $\delta_2$ and $\delta_3$. FIG. 4 demonstrates the division the circle into 12 azimuths and added times with symmetrical offsets $S_1$ and $S_2$ to eliminate influence of velocity gradient. We also stack opposite (symmetrical) offsets to simulate surface seismic NMO curve T(x) for further Dix-type inversion for interval anisotropic parameters.

Acquisition of the data may be done using Baker Hughes' multi level receiver (MLR) that can be configured from 1 to 100 levels. For 3D VSP data, we can use 300-channel SERCEL equipment with three-component hundred level borehole tool (one vertical and two horizontal components). This greatly speeds up the data acquisition. The downhole receivers can be run in combination with other logging services, either wireline or pipe-conveyed, reducing the number of trips into the well and saving rig time. In high-angle wells, the downhole receiver can be conveyed on drill pipe or coiled tubing and also run in combination with a variety of openhole logging services greatly reducing rig time.

The present disclosure addresses the problem of determining orthorhombic anisotropic formation velocities and five orthorhombic anisotropy parameters using a 3D VSP survey. In a multi-azimuthal walkaway or 3D VSP survey, measurements are made using a plurality of receivers in a borehole responsive to excitation of one or more seismic sources at a plurality of points covering some area around the well. The estimated velocities and orthorhombic anisotropic may then be used for migration of the 3D-VSP data or of 3D surface seismic data to produce an image of the earth formation and for interpretation purpose. The produced image may be used for drilling operations in the earth formation.

The inversion and migration methodology described above may be implemented on a general purpose digital computer. As would be known to those versed in the art, instructions for the computer reside on a machine readable memory device such as ROMs, EPROMs, EAROMs, Flash Memories and Optical disks. These may be part of the computer or may be linked to the computer by suitable communication channels, and may be even at a remote location. Similarly, seismic data of the type discussed above may be stored on the computer or may be linked through suitable communication channels to the computer. The communication channels may include the Internet, enabling a user to access data from one remote location and get the instructions from another remote location to process the data. The instructions on the machine readable memory device enable the computer to access the VSP data and process the data according to the method described above.

While the foregoing disclosure is directed to the preferred embodiments of the disclosure, various modifications will be apparent to those skilled in the art. It is intended that all such variations within the scope and spirit of the appended claims be embraced by the foregoing disclosure.

What is claimed is:

1. A method of evaluating an earth formation, the method comprising:
   deploying a plurality of seismic receivers in a borehole and receiving seismic signals in the plurality of seismic receivers responsive to an activation of at least one seismic source at a plurality of positions on the surface of the earth;
   using at least one processor configured to estimate, from travel times of the received seismic signals, a velocity model including velocities of vertically propagating seismic waves in a plurality of intervals, and at least two anisotropy parameters related to a normal moveout curve of compressional waves for the plurality of intervals, wherein at least one of the two anisotropy parameters is a Thomsen parameter $\epsilon$, the Thomsen parameter $\epsilon$ being estimated using a fraction set to a value between 0 and 0.5, the fraction comprising a square of a ratio of a shear velocity to a compressional wave velocity divided by a result of one minus the square of the ratio of the shear velocity to the compressional wave velocity; and
   using the estimated velocity model for producing an image of the earth formation.

2. The method of claim 1 further comprising using the produced image for drilling operations.

3. The method of claim 1 wherein the plurality of positions on the surface of the earth define a multi-azimuthal walkaway geometry, and the at least two anisotropy parameters further comprise five orthorhombic anisotropy parameters $\epsilon_1$, $\epsilon_1$, $\delta_1$, $\delta_2$ and $\delta_3$ related to a normal moveout velocity of compressional waves for the plurality of intervals.

4. The method of claim 1 further comprising, using, for at least one of the plurality of seismic receivers, a 3-component receiver.

5. The method of claim 1 further comprising deploying the plurality of seismic receivers on a conveyance device selected from: (i) a wireline, (ii) a pipe, and (iii) a coiled tubing.

6. The method of claim 1, further comprising estimating one of the at least two anisotropy parameters by approximating a moveout function representing the travel times by a shifted hyperbola.

7. A system for evaluating an earth formation, the system comprising:
- a plurality of seismic receivers configured to be conveyed in a borehole and receive seismic signals responsive to an activation of at least one seismic source at a plurality of positions on the surface of the earth; and
- at least one processor configured to:
  - (i) estimate, from travel times of the received seismic signals, a velocity model including velocities of vertically propagating seismic waves in a plurality of intervals, and at least two anisotropy parameters related to a normal moveout curve of compressional waves for the plurality of intervals, wherein at least one of the two anisotropy parameters is a Thomsen parameter $\epsilon$, the Thomsen parameter $\epsilon$ being estimated using a fraction set to a value between 0 and 0.5, the fraction comprising a square of a ratio of a shear velocity to a compressional wave velocity divided by a result of one minus the square of the ratio of the shear velocity to the compressional wave velocity; and
  - (ii) use the estimated velocity model for producing an image of the earth formation.

8. The system of claim 7 wherein the at least one processor is further configured to use the produced image for drilling operations.

9. The system of claim 7 wherein the plurality of positions on the surface of the earth define a multi-azimuthal walkaway geometry, and the at least two anisotropy parameters estimated by the at least one processor further comprise five orthorhombic anisotropy parameters $\epsilon_1$, $\epsilon_1$, $\delta_1$, $\delta_2$ and $\delta_3$ related to a normal moveout velocity of compressional waves for the plurality of intervals.

10. The system of claim 7 wherein at least one of the plurality of seismic receivers comprises a 3-component receiver.

11. The system of claim 7 further comprising a conveyance device configured to convey the plurality of receivers into the borehole, the conveyance device selected from: (i) a wireline, (ii) a pipe, and (iii) a coiled tubing.

12. The system of claim 7 wherein the at least one processor is further configured to estimate the at least two anisotropy parameters by approximating a moveout function representing the travel times by a shifted hyperbola.

13. A non-transitory computer-readable medium product having stored thereon instructions that when read by at least one processor cause the at least one processor to execute a method of evaluating an earth formation, the method comprising:
- estimating, from travel times of seismic signals received by an array of receivers in a borehole responsive to activation of at least one seismic source at a plurality of locations on a surface of earth, a velocity model including velocities of vertically propagating seismic waves in a plurality of intervals, and at least two anisotropy parameters related to a normal moveout curve of compressional waves for the plurality of intervals, wherein at least one of the two anisotropy parameters is a Thomsen parameter $\epsilon$, the Thomsen parameter $\epsilon$ being estimated using a fraction set to a value between 0 and 0.5, the fraction comprising a square of a ratio of a shear velocity to a compressional wave velocity divided by a result of one minus the square of the ratio of the shear velocity to the compressional wave velocity; and
- using the estimated velocity model for producing an image of the earth formation.

14. The non-transitory computer-readable medium product of claim 13 further comprising at least one of: (i) a ROM, (ii) an EPROM, (iii) an EAROM, (iv) a flash memory, and (v) an optical disks.

15. The method of claim 1, wherein the fraction is set to a value of 0.25.

16. A method of evaluating an earth formation, the method comprising:
- deploying a plurality of vertical seismic profile ("VSP") receivers at a plurality of respective depths in a borehole and receiving seismic signals in the plurality of VSP receivers responsive to an activation of at least one seismic source at a plurality of positions on the surface of the earth, the plurality of positions being at offset distances from the VSP receivers;
- measuring a first break time at each of two of the VSP receivers;
- using at least one processor to determine simulated reflected times, for simulated surface seismic receivers, from the measured first break times; and
- using at least one processor to estimate two anisotropy parameters related to a normal moveout curve from the simulated reflected times,
- wherein one of the two estimated anisotropy parameters is a Thomsen parameter $\delta$, and
- wherein the step of using the at least one processor to estimate the two anisotropy parameters related to the normal moveout curve from the simulated reflected times comprises the steps of:
  - using the simulated reflected times to estimate a normal moveout velocity ($V_{NMO}$);
  - using the estimated value of the $V_{NMO}$ to determine a Dix velocity ($V_{DIX}$); and
  - using the determined value of the $V_{DIX}$ and a measured value of a vertical velocity ($V_{VERT}$) at a zero offset to estimate a value of the Thomsen parameter $\delta$.

17. The method of claim 16, wherein the step of using the at least one processor to determine the simulated reflected times from the measured first break times and the step of using the at least one processor to estimate the two anisotropy parameters related to the normal moveout curve from the simulated reflected times are repeated for each pair of the VSP receivers having a separation distance between the two VSP receivers of the pair of at least 50 meters, and further comprising:
- smoothing the estimated values of the Thomsen parameter $\delta$ for each pair of the VSP receivers having the minimum separation distance to obtain a smoothed value of the Thomsen parameter $\delta$ as a function of depth.

18. The method of claim 16, wherein the simulated reflected times are simulated at simulated offset distances, between the at least one seismic source and the simulated surface seismic receivers, which are twice the offset distances between the at least one seismic source and the VSP receivers at which the first break times used to determine the simulated reflected times are measured.

19. The method of claim 16, wherein a second Thomsen parameter $\epsilon$ is one of the two anisotropy parameters estimated.

20. The method of claim 19, wherein the second Thomsen parameter $\epsilon$ is estimated using a fraction comprising a square of a ratio of a shear velocity to a compressional wave velocity divided by a result of one minus the square of the ratio of the shear velocity to the compressional wave velocity, the fraction being set to a selected value of 0.25.

21. A system for evaluating an earth formation, the system comprising:

a plurality of seismic receivers configured to be conveyed in a borehole and placed at a plurality of respective depths and further configured to receive seismic signals responsive to an activation of at least one seismic source at a plurality of positions on the surface of the earth; and at least one processor configured to:
  (i) determine simulated surface reflected times from first arrival travel times of the received seismic signals at each pair of the seismic receivers wherein the seismic receivers of the pair are separated by at least 50 meters;
  (ii) use the simulated surface reflected times to estimate at least two anisotropy parameters related to a normal moveout curve of compressional waves for a plurality of intervals and to estimate a velocity model; and
  (iii) use the estimated velocity model for producing an image of the earth formation, wherein one of the at least two estimated anisotropy parameters is a Thomsen parameter $\delta$, and wherein the at least one processor is further configured to use the simulated surface reflected times (a) to estimate the at least two anisotropy parameters related to the normal moveout curve of compressional waves for the plurality of intervals and (b) to estimate a velocity model by performing the steps of:

using the simulated surface reflected times to estimate a normal moveout velocity ($V_{NMO}$);

using the estimated value of the $V_{NMO}$ to determine a Dix velocity ($V_{DIX}$); and using the determined value of the $V_{DIX}$ and a measured value of a vertical velocity ($V_{VERT}$) at a zero offset to estimate a value of the Thomsen parameter $\delta$.

22. A non-transitory computer-readable medium product having stored thereon instructions that when read by at least one processor cause the at least one processor to execute a method of evaluating an earth formation, the method comprising:

(i) determining simulated surface reflected times from first arrival travel times of received seismic signals at each pair of a plurality of seismic receivers placed in a borehole at a plurality of respective depths, the seismic signals being responsive to activation of at least one seismic source at a plurality of positions outside of the borehole, and the seismic receivers of each pair being separated by at least 50 meters;

(ii) using the simulated surface reflected times to estimate at least two anisotropy parameters related to a normal moveout curve of compressional waves for a plurality of intervals and to estimate a velocity model; and (iii) using the estimated velocity model for producing an image of the earth formation, wherein one of the at least two estimated anisotropy parameters is a Thomsen parameter $\delta$, and wherein the step of using the simulated surface reflected times to estimate the at least two anisotropy parameters related to the normal moveout curve of compressional waves for the plurality of intervals and to estimate a velocity model comprises:

using the simulated surface reflected times to estimate a normal moveout velocity ($V_{NMO}$);

using the estimated value of the $V_{NMO}$ to determine a Dix velocity ($V_{DIX}$); and using the determined value of the $V_{DIX}$ and a measured value of a vertical velocity ($V_{VERT}$) at a zero offset to estimate a value of the Thomsen parameter $\delta$.

* * * * *